United States Patent [19]

Fukui

[11] Patent Number: 4,555,734
[45] Date of Patent: Nov. 26, 1985

[54] VIDEO TIME BASE AND DROP OUT CORRECTOR

[75] Inventor: Tsutomu Fukui, Tokyo, Japan

[73] Assignee: Asahi Kogaku Kogyo Kabushiki Kaisha, Tokyo, Japan

[21] Appl. No.: 409,827

[22] Filed: Aug. 20, 1982

[30] Foreign Application Priority Data

Aug. 24, 1981 [JP] Japan ............................... 56-131628

[51] Int. Cl.⁴ ..................... H04N 5/94; H04N 5/95
[52] U.S. Cl. ................................ 358/314; 358/320; 358/337; 360/36.1; 360/38.1
[58] Field of Search ............ 369/60, 48, 47; 360/26, 360/27, 361, 38.1; 358/337, 342, 314, 320, 326, 336

[56] References Cited

U.S. PATENT DOCUMENTS 4,228,460 10/1980 Rotter ................................ 358/337
4,313,129 1/1982 Fukui ................................ 358/342
4,353,089 10/1982 Winslow ........................... 358/342

FOREIGN PATENT DOCUMENTS 58681 4/1980 Japan .

Primary Examiner—Alan Faber
Attorney, Agent, or Firm—Fleit, Jacobson, Cohn & Price

[57] ABSTRACT

An apparatus for reproducing recorded data by detecting data recorded on a rotary recording medium while rotating said rotary recording medium includes a variable delay for delaying a detected data signal, a phase-locked loop for generating a clock signal that controls the variable delay, and a reference signal generator for providing synchronization to a clock signal obtained from said phase-locked loop.

4 Claims, 3 Drawing Figures

VIDEO TIME BASE AND DROP OUT CORRECTOR

This invention relates to an apparatus for reproducing a demodulated video signal or a demodulated audio signal obtained by detecting an FM signal or like data from a rotary recording medium such as a video disc while rotating the rotary recording medium.

A demodulated video signal generally contains noise components which cause drop-outs and also time-axis errors due to the eccentricity of the video disc, defectiveness of the mechanical precision of video disc mounting section (spindle runout) and so on. The demodulated audio signal usually contains time-axis errors mainly resulting from wows and flutters.

There is known various means for processing demodulated video signals or like signals such as one disclosed in Japanese Patent Laid-open application No. 55-58681. The disclosed means is provided with a closed loop system, in which a burst signal in the detected FM signal and a reference frequency signal are phase compared and a time-axis error signal that is obtained as a result of the phase comparison is fed through a CCD (charge-coupled device) to a variable delay. Means is also provided with an open loop system, in which the horizontal sync signal in the demodulated video signal and the reference frequency signal are phase compared and a time-axis error signal which is obtained as a result thereof is added to an error signal of the closed loop system, the sum of signals added together being supplied to the variable delay.

The use of the closed loop and open loop in combination permits fine time-axis error compensation to be effected by the former and rough time-axis error compensation to be effected by the former.

With this prior art system, it is possible to avoid the use of a multiplex closed loop system which requires a high gain. However, to extend the range of delay while permitting modulation requires an increase of delay stages of the CCD or the like because of the characteristics thereof. This is undesired from the standpoints of manufacturing and cost. Further, the rough time-axis error compensation causes undesired DC variable components to be introduced in the video signal after compensation, thus giving rise to the flicker in the reproduction of image. Further, for compensation of drop-outs, a 1H delay line for delaying the detected FM signal for one horizontal sync period (i.e., 1H) has to be provided in the drop-out compensator. Such a 1H delay line, however, consists of a supersonic delay element using glass as a propagation medium and is very expensive. Besides, the transmission bandwidth of the signal due to the 1H delay line is about 1.5 MHz and is not suitable for obtaining a color reproduced image. Further, the amount of delay due to the 1H delay line is fixed to the 1H period, and therefore it is impossible to effect compensation for drop-outs longer than this period.

Furthermore, the audio signal is separated from the video signal at the time of the detection of the detected FM signal, so that it is not compensated for the time-axis error component. Therefore, it is impossible to remove wow and flutter component and hence to obtain good reproduced sound.

There has been known another system, in which the timing edge of the horizontal sync signal contained in the demodulated video signal is replaced with a timing edge derived from the burst signal and this substitute timing signal is phase-compared with a reference timing signal to obtain the time-axis error signal. This time axis error signal is used with a multiplex closed loop system to effect time-axis error compensation for a spindle motor for driving a video disc and a tangential mirror for moving the scan position of a laser beam for extracting the detected FM signal from the video disc.

However, this system requires an additional circuit for eliminating instability accompanying the adoption of the multiplex loop system. Further, the detection sensitivity of the phase comparator with respect to the color burst phase error detection is reduced because the detectable time-axis error due to the burst signal is also extended up to a range capable of detection with the horizontal sync signal and also that only a single timing edge in the burst signal is extracted. Therefore, the signal-to-noise ratio of the time-axis error signal is deteriorated, thus promoting various external disturbance with respect to the servo systems for the spindle motor and tangential mirror. Further, since the vertical blanking period, unlike the horizontal sync period, is free from burst signal, the tangential mirror is subject to noise modulation, thus adversely affecting the demodulated audio signal so that satisfactory reproduced sound cannot be obtained.

SUMMARY OF INVENTION

The present invention is intended to overcome the above problems encountered in the prior art. According to the present invention, in an apparatus for reproducing recorded data by detecting data recorded in a recording medium, a variable delay for adaptively delaying the demodulated video signal obtained by detection is controlled by a phase-locked loop synchronized with the oscillation output of a reference frequency generator. The delay signal that is obtained with this construction can be used for many purposes such as time control of the time-axis errors, compensation for drop-outs, etc. It is thus possible to solve the problems in the prior art with a simple construction and at a low cost.

DESCRIPTION OF ILLUSTRATIVE EMBODIMENT

Now, an embodiment of the present invention will be described.

Figure 1:
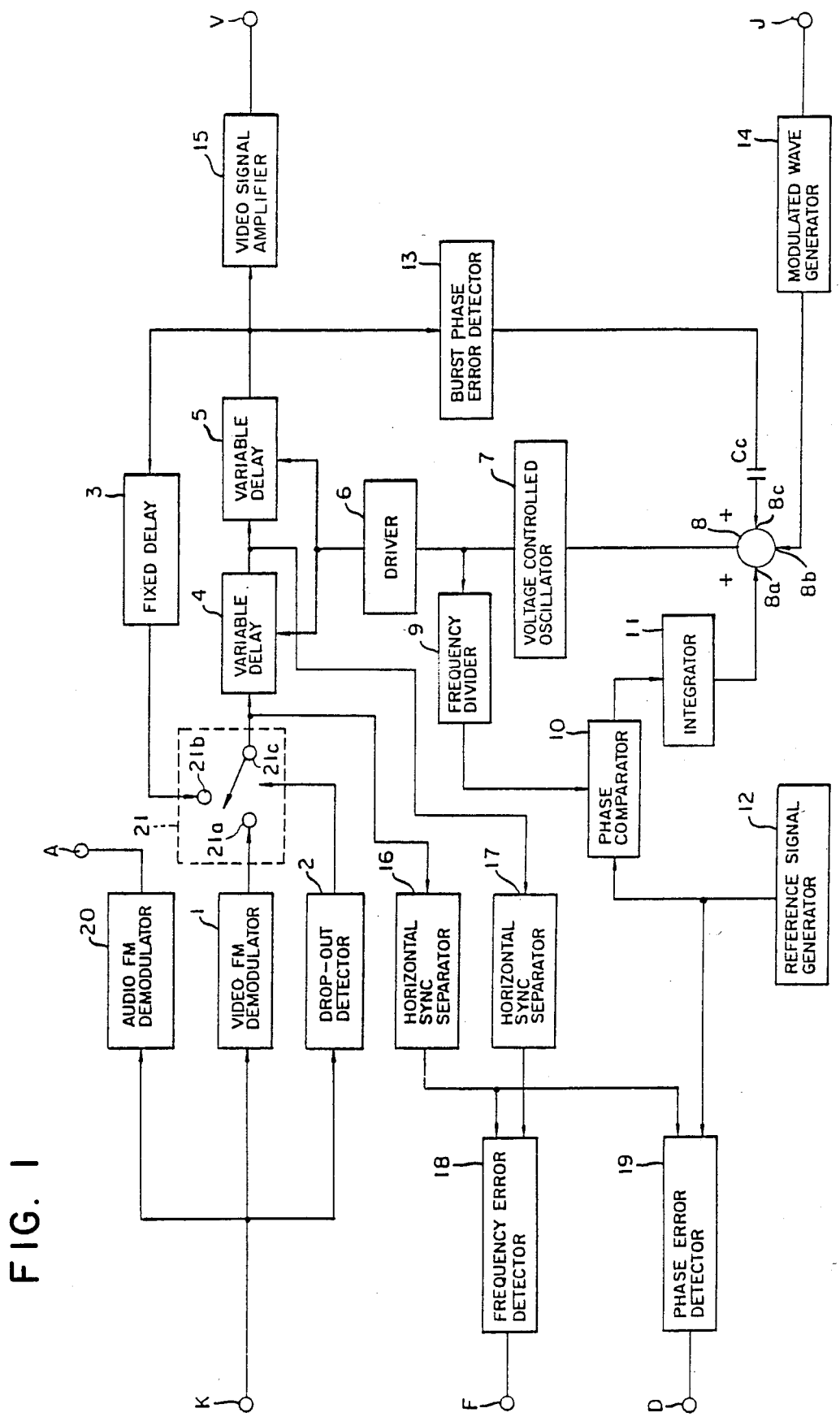
FIG. 1 is a block diagram showing the basis construction of the apparatus according to the present invention.

The basic construction shown in FIG. 1 will first be described. Detected FM signal from a video disc, such as a rotary recording medium, is supplied to an input terminal K. The detected FM signal may be a frequency-modulated signal containing color video data and audio data based on a conventional NTSC system. The detected FM signal supplied to the input terminal K is demodulated by a video FM demodulator 1 to produce a video signal. The detected FM signal is also fed to a drop-out detector 2 to detect instants of drop-outs in the detected FM signal. The drop-out detector 2 controls a drop-out switch 21 which may comprise a gated transistor array. The switch 21 is switched to a terminal 21b at a time of a drop-out of the demodulated video signal fed to an input terminal 21a. The output terminal 21c of the drop-out switch 21 is connected to first and second variable delays 4 and 5 which are provided as two stages. The demodulated video signal having passed through the second variable delay 5 is fed through a video signal amplifier 15 to a video signal output terminal V.

A reproducing apparatus such as a television monitor may be connected to the output terminal V to obtain image reproduction.

The first and second variable delays 4 and 5 are analog signal delays such as CCDs or BBDs (bucket brigade device). Their respective delay periods may be changed according to the transfer clock frequency. A driver 6 is connected to the variable delays 4 and 5. The driver 6 converts a single clock signal fed at the level of TTL (transistor Transistor logic) from a voltage controlled oscillator 7 and serves as an interface for driving the variable delays 4 and 5.

The voltage controlled oscillator 7 is connected to the output terminal of an adder 8. A first input terminal 8a of the adder 8 is connected to the output terminal of a phase comparator 10 through an integrator 11. The integrator 11 serves to limit frequency characteristic of the phase comparator 10 to a very low DC frequency range. One input terminal of the phase comparator 10 is connected to the output terminal of the voltage controlled oscillator 7 through a frequency divider 9. The other input terminal of the phase comparator 10 is connected to the output terminal of a reference signal generator 12. The voltage controlled oscillator 7, adder 8, frequency divider 9, phase comparator 10 and integrator 11 form a loop serving as a so-called PLL (Phase-lock loop).

The delay time $\tau$ of the variable delays 4 and 5, the transfer clock frequency $f_C$ and the number N of transfer stages are related to one another as $$\tau = N/f_C \qquad (1)$$

The transfer clock frequency $f_C$ is obtained from the output of the PLL, and it is synchronized to the oscillation frequency $f_R$ of a reference signal generator 12.

Denoting the number of stages of the frequency divider 9 as n, we obtain a relation $$f_C = n \cdot f_R \qquad (2)$$

Substituting the equation (2) into the equation (1), $$\tau = \frac{N}{n \cdot f_R} \qquad (3)$$

The total delay of the variable delays 4 and 5 is thus controlled by the oscillation frequency $f_R$ of the reference signal generator 12.

In the compensation for drop-outs in the video signal, at the time of a drop-out a portion of video signal of one horizontal sync period in duration, i.e., 1H, before the prevailing portion of signal is generally substituted. For this reason, the delay $\tau$ may be set equal to the inverse to 1H, i.e., the horizontal sync signal frequency $f_H$ (15.75 KHz). In consequence, we have a relation $$\tau = \frac{1}{f_H} = \frac{N}{n \cdot f_R} \qquad (4)$$

Hence, the number n of the stages of the frequency divider is $$n = \frac{f_H}{f_R} N \qquad (5)$$

Since the frequency divider stage number n is to be an interger, the oscillation frequency $f_R$ is selected to be an integral multiple of the horizontal sync frequency $f_H$.

The delayed output of the variable delay 5 is fed back to the terminal 21b of the drop-out switch 21 through a fixed delay 3. The fixed delay 3 causes further delay for one half-period of the phase of the chroma signal for the chroma signal phase is inverted for one horizontal sync period due to frequency interleaving in the video signal of the NTSC system. Thus, phase match of the chroma signal can be obtained at the time of compensation for drop-out, thus permitting compensation for up to the color range.

The input terminals of the variable delays 4 and 5 are connected to respective horizontal sync separators 16 and 17, which are connected to a frequency error detector 18 which detects a frequency error in the reproduced detected FM signal. The delay period ½H of a variable delay 4 is held constant at the reference time axis of the reference signal generator 12 by the PLL mentioned above. When the time-axis of the reproduced detected FM signal is coincident with the time axis of the reference signal generator 12, the phase difference between the outputs of the horizontal sync separators 16 and 17 is held at 180°. When the time-axis of the reproduced detected FM signal deviates from the time axis of the reference signal generator 12, the phase difference between the outputs of the horizontal sync separators 16 and 17 changes back and forth about 180° according to the deviation of time-axis, i.e., frequency deviation. The phase difference thus obtained is converted to a corresponding voltage, whereby a frequency error signal with respect to the reproduced detected FM signal can be obtained from an output terminal F. Thus, it is possible to obtain a so-called motor servo by supplying the frequency error signal together with a horizontal sync error signal to be described later to the spindle motor servo system for the video disc.

The output terminal of the horizontal sync separator 16 is connected to one input terminal of a phase error detector 19. The other input terminal of the phase error detector 19 is connected to a reference signal generator 12. The phase error detector 19, like the frequency error detector 18, is constituted by a phase comparator based on a PWM (pulse width modulation) system which is a sample/hold system.

The horizontal sync phase error signal obtained from the output terminal D of the phase error detector 19, is supplied to a servo system for controlling a tangential mirror for the video disc player.

Thus, compression of the time-axis error is effected such as to make the time-axis of the detected FM signal to coincide with the reference time-axis of the reference signal generator 12.

From the output of the second variable delay 5, the color burst signal contained in the video signal is extracted. The phase of this extracted signal is compared with, for instance, the reference phase of the reference signal generator 12. A burst phase error detector 13 converts the phase difference thus obtained to a corresponding voltage. Of the burst phase error voltage obtained from the burst phase error detector 13, only the AC component is coupled through a coupling capacitor Cc to the input terminal of the adder 8. The burst phase error detector 13, coupling capacitor Cc, adder 8, voltage controlled oscillator 7, driver 6 and first and second variable delays 4 and 5 constitute a loop circuit which serves as a fine time- axis error compensator for effecting time-axis error compensation up to the phase precision of the burst signal.

With this fine time-axis error compensator, the time-axis error compensation can be obtained independently of the multiplex closed loop servo system for the spindle motor and tangential mirror respectively controlled by the frequency error signal and horizontal phase error signal, and thus the whole system can be stabilized. Thus, it is possible to eliminate the influence of various external disturbances and obtain high quality image reproduction.

The output of a modulated wave generator 14 is fed to the input terminal 8b of the adder 8. The modulated wave generator 14 receives a jump signal from a jump pulse input terminal J and produces a rectangular wave with a duty ratio of 0.5 at 15Hz. At the time of reproduction of a stop motion with, for instance, an optical video disc of CAV (constant angular velocity), the chroma signal is inverted for the frame of the reproduced image, so that the color chroma signal becomes discontinuous when a laser beam scanning the video disc jumps a track. This discontinuity causes color irregularity or flicker in the image reproduction. In order to prevent this, it is necessary to modify the delay time of the variable delays 4 and 5 for one half period of the burst signal at the time of jumping. This modulation signal is obtained from the modulated wave generator 14.

As described earlier, a control signal for compressing the time-axis error of a large variable range is applied to the multiplex loop servo system for the spindle motor and tangential mirror. Thus, sufficient time-axis error compensation of the detected FM signal supplied from the audio FM demodulator 20 is done. Therefore, the demodulated audio signal obtained from the audio FM demodulator 20 contains substantially no wow or flutter component and also no noise is superimposed during the vertical blanking period, so that satisfactory reproduced sound can be obtained.

Now, the relation between the delay provided by the variable delays 4 and 5 and the control voltage Vc of the voltage controlled oscillator 7, i.e., the time-axis error voltage, in the time axis error compensation will be discussed.

In a normal voltage controlled oscillator 7, the oscillation frequency $f_C$ changes linearly with the control voltage Vc. Thus, denoting the center frequency of the oscillation frequency $f_C$ as $f_o$, $$f_C = f_0 + V_c \cdot \Delta f \quad (6)$$

where $V_c \cdot \Delta f$ is the change in the oscillation frequency $f_C$.

Substitution of the equation (6) into the equation (1) yields $$t = \frac{N}{f_0 + V_c \cdot \Delta f} = \frac{N}{f_0}\left(1 - \frac{V_c \cdot \Delta f}{f_0} + \frac{[V_c \cdot \Delta f]^2}{f_0} \cdots \right) \quad (7)$$

Thus, if the change in the oscillation frequency $f_C$ is sufficiently small so that there holds a relation $$1 >> \frac{V_c \cdot \Delta f}{f_0} \quad (8)$$

the equation (7) reduces to $$\tau \approx \frac{N}{f_0}\left[1 - \frac{V_c \cdot \Delta f}{f_0}\right] \quad (9)$$

Here, the coefficient $N/f_0$ is equal to the delay $\tau_H$ for one horizontal scanning period controlled DC-wise by the PLL circuit mentioned above. Thus, the change $\Delta\tau$ in the delay time concerning the time-axis error compensation is $$\Delta\tau = \frac{N \cdot V_c \cdot \Delta f}{f_0^2} \quad (10)$$

So long as the equation (10) holds, $\Delta\tau$ changes DC-wise with the control voltage Vc under the condition of the equation (8), and thus there arises no inconvenience in respect of the characteristics of the servo system.

Figure 2A:
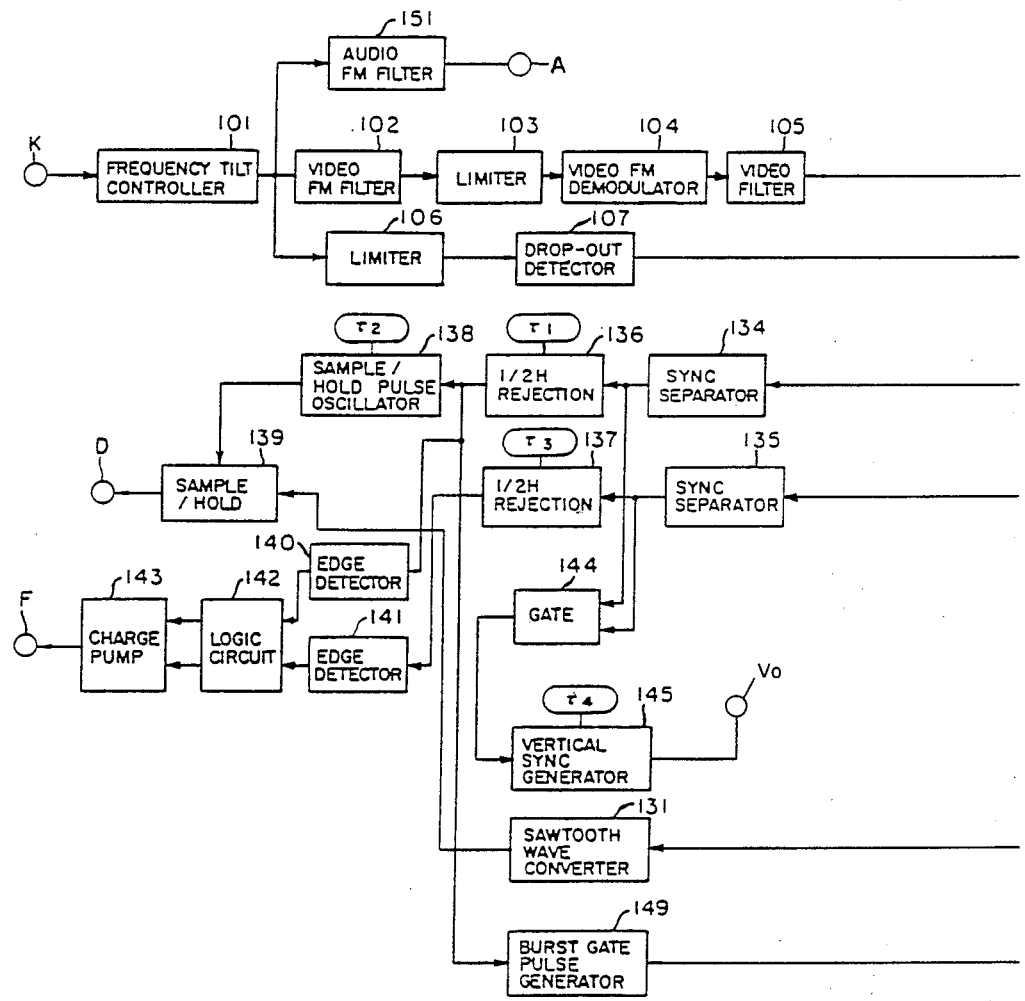
FIGS. 2A and 2B show a detailed block diagram showing the construction of FIG. 1 in further detail.
Figure 2B:
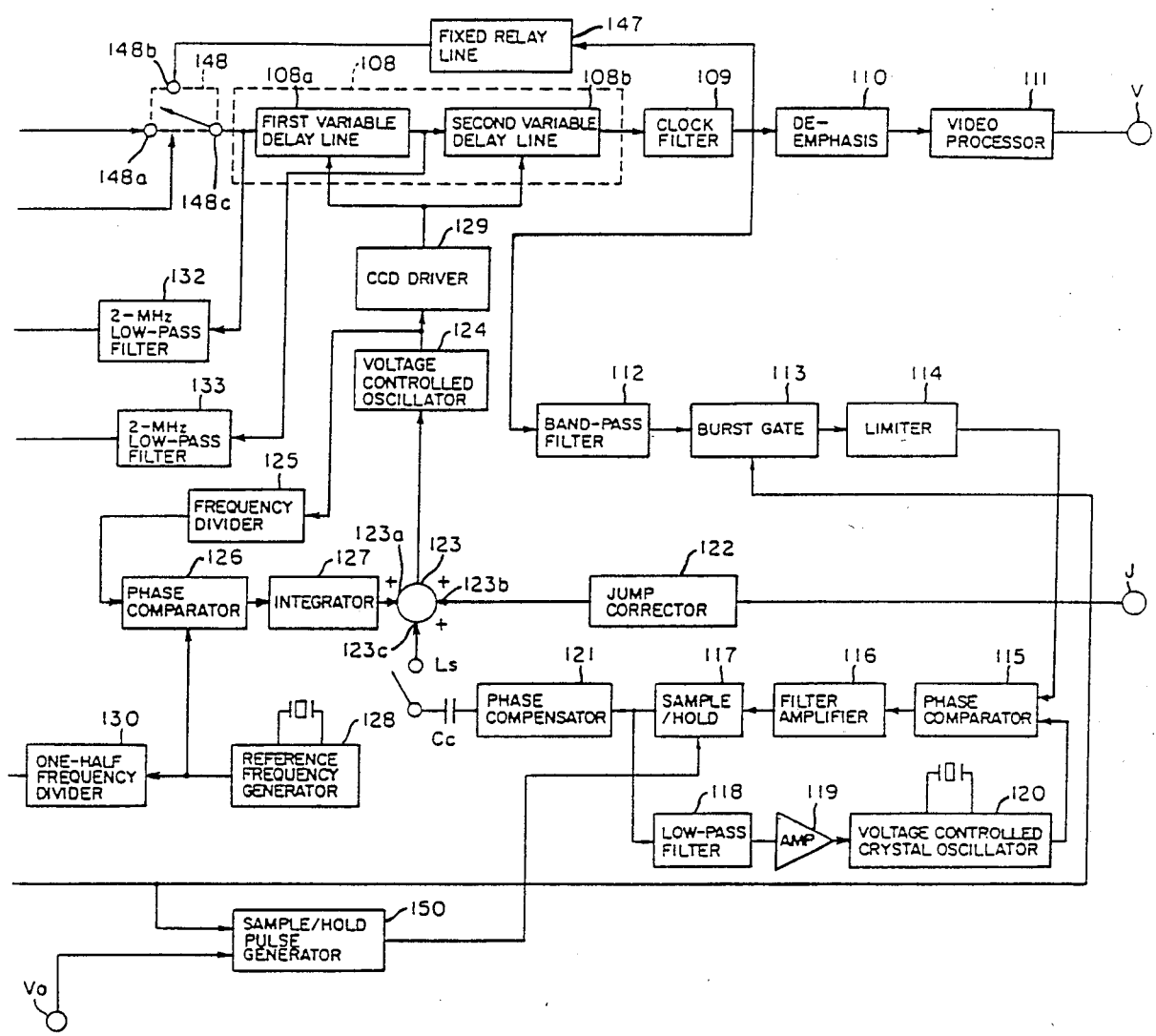

While the basic construction according to the present invention is as described above, a specific example thereof will now be described in detail with reference to FIGS. 2A and 2B. Overlapping portions will not be described.

The detected FM signal supplied to an input terminal K is fed to a frequency tilt controller 101. The output of the frequency tilt controller 101 is fed to a video FM filter 102, an audio FM filter 151 and a limiter 106. The output of the audio FM filter 151 is fed to the audio demodulator. The output of the video FM filter 102 is fed through a limiter 103 to a video FM demodulator 104. The output of the video FM demodulator 104 is fed to a video filter 105. The output of the limiter 106 is fed to a drop-out detector 107. The output of the video filter 105 is fed to one input terminal 148a of a drop-out switch 148. The drop-out switch 148 is controlled by the output of the drop-out detector 107. The output terminal 148c of the drop-out switch 148 is connected to a two-stage CCD delay line 108 with a transfer stage number of 910. The CCD delay line 108 is driven by a two-phase clock from a CCD driver 129. The CCD is a sampling device, so that it produces return noise and the transferred clock is superimposed upon its output. To remove the noise, a video filter 105 is connected to the input terminal 148a of the drop-out switch 148, while a clock filter 109 is connected to the output terminal of the CCD delay line 108. A fixed delay line 147 for delay for one half-period of the color burst signal (140n sec.) is connected to the output side of the clock filter 109. The fixed delay line 147 is connected to the other input terminal 148b of the drop-out switch 148.

The output of the clock filter 109 is fed to a de-emphasis 110 (limiter or attenuator) for placing de-emphasis on the characteristics of the demodulated video signal at the time of recording. The output of the de-emphasis 110 is fed to a video processor 111. In the video processor, the input video signal is subjected to such processes as insertion of characters, squelch, etc. The resultant video signal from the video processor 111 is fed to a video signal output terminal V.

The output of the clock filter 109 is fed to a band-pass filter 112 for extracting the color burst from the video signal. The extracted burst output is fed through a burst gate 113 to a limiter 114. In this way, the color burst signal is converted to TTL level. The burst gate 113 is connected to a burst gate pulse generator 149 which produces a burst gate signal of a deviated timing from the horizontal sync signal.

The output of the limiter 114 is fed to one input terminal of a phase comparator 115, and its other input terminal is supplied with an output from a voltage controlled crystal oscillator 120 oscillating at the average frequency of the burst signal. The output of the phase comparator 115 is fed through a filter amplifier 116 to a sample/hold 117. The output of the sample/hold 117 is fed through a low-pass filter 118 and an amplifier 119 to the voltage controlled crystal oscillator 120. It is to be understood that the error signal component coupled to the voltage controlled crystal oscillator 120 is limited through the low-pass filter 118 to a super-low frequency component so that only an AC variable component is detected as the burst phase error at the output of the sample/hold 117. The output of the sample/hold 117 is fed to a phase compensator 121 for compensating for the servo characteristics of the time-axis error compensation loop. The output of the phase compensator 121 is fed through a coupling capacitor Cc and a loop switch Ls to an adder 123.

The output of the adder 123 is fed to a voltage controlled oscillator 124. The output of the voltage controlled oscillator 124 is fed through a frequency divider 125 to one input terminal of a phase comparator 126. The other input terminal of the phase comparator 126 is supplied with an output of a reference frequency generator 128 oscillating at 2 $f_H$. The output of the phase comparator 126 is fed through an integrator 127 to a first input terminal 123a of the adder 123. A phase-locked loop is constructed in the above way, and its output is fed through the CCD driver 129 to the variable delay 108 to drive the same.

The oscillation frequency 2 $f_H$ of the reference frequency generator 128 is divided through a one-half frequency divider 130 to $f_H$, and this output at the frequency $f_H$ is fed to a sawtooth wave converter 131 for conversion into a sawtooth wave which is used for detecting phase error of the horizontal sync signal. The sawtooth wave is fed to the sample/hold 139, and the output thereof is fed to a horizontal sync phase error signal output terminal D.

The output terminal 148c of the drop-out switch 148, i.e., the input terminal of the first variable delay line stage 108a, and the output terminal of this delay line stage 108a are connected to respective 2-MHz low-pass filters 132 and 133. With this arrangement, the sync signal can be readily separated from the demodulated video signal. The signals fed to the low-pass filters 132 and 133 respectively, are spaced apart in time from each other by ½H. The signals having passed through the low-pass filters 132 and 133 are fed through sync separators 134 and 135 to ½H rejection circuits 136 and 137 to obtain the separated horizontal sync signal. The horizontal sync signal obtained from the ½H rejection circuit 136 is fed through a sample/hold pulse oscillator 138 to a sample/hold 139. The sample/hold 139, to which the output of the sawtooth wave converter 131 is fed, samples and holds a voltage corresponding to the phase difference between the horizontal sync signal and sawtooth wave, and the horizontal sync signal phase error signal is obtained from the output terminal D. The two different horizontal sync signals obtained from the respective ½H rejection circuits 136 and 137 are fed to edge detectors 140 and 141 to detect timing edges. These timing edges are fed to a logic circuit 142, which may be R-S flip-flop, for modulation to a pulse width corresponding to the phase difference. This pulse width modulation wave is converted through a charge pump 143 to an analog frequency error signal voltage which is fed to an output terminal F.

To extract the vertical sync signal in the vertical blanking signal among the outputs of the sync separators 134 and 135, the coincident timing portions are taken out as ½H pulse train through a gate 144 which may be a NOR gate. This pulse train is fed to a vertical sync generator 145 which may be a mono-stable multivibrator for digital integration to obtain the vertical sync signal. This vertical sync signal can be used as a high precision reference signal, and it is thus fed to a vertical sync signal output terminal $V_0$ so that it can be used at the time of the reproduction of the stop motion and as a time reference for the extraction of inserted data.

The output of the ½H rejection circuit 136 is fed to a burst gate generator 149. The output of the generator 149 is fed to a sample/hold pulse generator 150 to let the sample/hold 117 produce sample/hold pulses used for the detection of the burst signal error. The sample/hold pulse generator 150 is supplied with the vertical sync signal of the vertical sync generator 145 to prevent generation of sample/hold pulses during the vertical blanking period.

A jump pulse that is required at the time of reproducting a stop motion is supplied to a jump pulse input terminal J, and is fed through a jump connector 122 to an input terminal 123b of the adder 123.

In this embodiment, if the oscillation frequency 2 $f_H$ of the reference frequency generator 128 is set to 2 $f_H$, the number frequency division stages of the frequency divider 125 is four hundred and fifty-five (455) from the equation (5). Thus, the center frequency $f_0$ of the voltage controlled oscillator 124 is 14,318 MHz, i.e., 910·$f_H$, from the equation (2).

As has been described in the foregoing, with the apparatus for reproducing recorded data by detecting data recorded on a rotary recording medium such as a video disc while rotating the rotary recording medium according to the present invention, in which a variable delay for delaying data signal obtained by detection, a phase-locked loop for clock controlling the variable delay and a reference signal generator for synchronizing the phase-locked loop to the clock signal are provided, the delay amount of the time-axis of the detected FM signal in a video disc player, for instance, can be accurately determined. Thus, the drop-out compensation, fine time-axis error compensation and servo system control based on the detection of the frequency error and horizontal sync phase error can be effected with a simple circuitry and also reliably. Further, it is possible to reduce cost. Further, the drop-out compensation can be effectively attained even with reproduced image of a high degree of color saturation. Since the fine time-axis error compensation and rough time-axis error compensation can be made independently, the stability of the whole system can be increased to permit reproduction of high quality date to be obtained without being influenced by various external disturbances.

What is claimed is:

1. An apparatus for reproducing recorded data, comprising:
   a video FM demodulator means for demodulating a video FM signal detected from a video disc and for providing a demodulated video signal;
   a variable delay device means connected after said video FM demodulator, and being clock-controlled, for varying the delay time of said demodulated video signal;
   a reference signal generator means for generating a reference signal which serves as the reference time base;
   a phase-locked loop including at least a voltage controlled oscillator and a phase comparator, in which the oscillating output from said voltage controlled oscillator and said reference signal are supplied to said phase comparator, and said voltage controlled oscillator is controlled by the output produced by said phase comparator so that said oscillating output is synchronized to said reference signal;
   a drive circuit means receiving said oscillating output for producing a transfer clock signal which is supplied to said variable delay means to clock-control and to vary the delay time thereof; and
   a frequency divider provided between said voltage controlled oscillator and said phase comparator for causing said variable delay means to delay said demodulated video signal for one horizontal sync period according to said reference time base.

2. An apparatus for reproducing recorded data as claimed in claim 1 wherein said demodulated video signal includes a color band and a color burst signal further comprising:
   a drop-out detector means receiving said video FM signal for detecting drop-outs in said video FM signal; and
   a drop-out switch means provided between said video FM demodulator and said variable delay means, responsive to a drop-out detection signal supplied from said drop-out detector for switching between said demodulated video signal supplied directly from said video FM demodulator and said demodulated video signal having been delayed by one horizontal sync period, and for effecting correction of drop-outs up to the color band according to the color burst signal which is included in said demodulated video signal having been delayed by one horizontal sync period and which is fed through a fixed delay which delays the phase of the color burst signal by 180°.

3. An apparatus for reproducing recorded data, comprising:
   a video FM demodulator means for demodulating a video FM signal detected from a video disc and for providing a demodulated video signal, said demodulated video signal including a color burst signal;
   a variable delay device means connected after said video FM demodulator, and being clock-controlled, for varying the delay time of said demodulated video signal;
   a reference signal generator means for generating a reference signal which serves as the reference time base;
   a phase-locked loop including at least a voltage controlled oscillator and a phase comparator, in which the oscillating output from said voltage controlled oscillator and said reference signal are supplied to said phase comparator, and said voltage controlled oscillator is controlled by the output produced by said phase comparator so that said oscillating output is synchronized to said reference signal;
   a drive circuit means receiving said oscillating output for producing a transfer clock signal which is supplied to said variable delay means to clock-control and to vary the delay time thereof;
   a frequency divider provided between said voltage controlled oscillator and said phase comparator in said phase-locked loop for causing said variable delay means to delay said demodulated video signal for one horizontal sync period according to said reference time base; and
   a fine time-axis error compensator including:
   a color burst separator for extracting the color burst signal included in said demodulated video signal delayed by one horizontal sync period and supplied from said variable delay means;
   a time-axis error extractor for producing, according to the phase error component in said color burst signal extracted by said color burst separator, a time-axis error signal representing time axis error; and
   an adder for adding said time-axis error signal and the output from said phase comparator for supplying said voltage controlled oscillator with the sum of said time-axis error signal and said phase comparator output.

4. An apparatus for reproducing recorded data, comprising:
   a video FM demodulator means demodulating a video FM signal detected from a video disc for providing a demodulated video signal;
   a variable delay means connected after said video FM demodulator, and being clock-controlled, for varying the delay time of said demodulated video signal;
   a reference signal generator means for generating a reference signal which serves as the reference time base;
   a phase-locked loop including at least a voltage controlled oscillator and a phase comparator, in which the oscillating output from said voltage controlled oscillator and said reference signal are supplied to said phase comparator, and said voltage controlled oscillator is controlled by the output produced by said phase comparator so that said oscillating output is synchronized to said reference signal;
   a drive circuit means receiving said oscillating output for producing a transfer clock signal which is supplied to said variable delay means to clock-control and to vary the delay time thereof;
   said variable delay means including a pair of series-connected variable delay elements each delaying said demodulated video signal for half the horizontal sync period, the horizontal sync signal included in said demodulated video signal having been delayed by half the horizontal sync period by one of said pair of delay elements and the horizontal sync signal not yet delayed by said pair of delay elements being supplied to a frequency error detector through a pair of horizontal sync signal separators respectively; and
   said frequency error detector detecting the phase difference between said horizontal sync signal having been delayed by half the horizontal sync period and said horizontal sync signal not yet delayed, for producing a frequency error signal for a spindle motor servo system.

* * * * *